United States Patent [19]
Uhlig

[11] 3,952,777
[45] Apr. 27, 1976

[54] HOLLOW BODY FOR HEATED GASES

[75] Inventor: Klaus Uhlig, Zurich, Switzerland

[73] Assignee: Brown Boveri-Sulzer Turbomaschinen Aktiengesellschaft, Zurich, Switzerland

[22] Filed: Dec. 18, 1973

[21] Appl. No.: 425,882

[30] Foreign Application Priority Data
Dec. 20, 1972 Switzerland.................... 018588/72
Dec. 29, 1972 Germany............................ 2264354

[52] U.S. Cl.............................. 138/149; 138/113; 220/9 B; 220/9 D
[51] Int. Cl.².................... F16L 9/18; F16L 9/22
[58] Field of Search............ 138/113, 114, 147–149; 220/9 A, 9 B, 9 D, 9 LG; 210/487, 489, 492; 176/60; 181/36 B, 42, 50, 55

[56] References Cited
UNITED STATES PATENTS

| | | |
|---|---|---|
| 2,331,645 | 10/1943 | Sltorfer et al................... 138/149 X |
| 2,348,754 | 5/1944 | Ray...................................... 138/149 |
| 2,451,146 | 10/1948 | Baker et al. ........................ 138/149 |
| 2,468,902 | 5/1949 | Villiger............................ 138/148 X |
| 2,707,493 | 5/1955 | Bonvillian et al.............. 138/148 X |
| 2,761,525 | 9/1956 | Moss................................ 138/149 X |
| 3,009,601 | 11/1961 | Matsch............................ 220/9 LG |
| 3,155,117 | 11/1964 | Spillman.............................. 138/149 |
| 3,241,702 | 3/1966 | Nauikas................................ 220/9 D |

Primary Examiner—Richard C. Queisser
Assistant Examiner—Charles Gorenstein
Attorney, Agent, or Firm—Robert A. Ostmann

[57] ABSTRACT

Hollow body or structure for heated gases and under high pressure having an insulating intermediate space between an external wall and a perforated partition wall; the insulating space being provided with perforated intermediate walls situated parallel to the external wall and the partition wall; the throttling effect of the perforated partition wall and of the perforated intermediate walls increases from wall to wall outwardly from the inside of the hollow body.

7 Claims, 2 Drawing Figures

HOLLOW BODY FOR HEATED GASES

BACKGROUND OF THE INVENTION

The invention relates to a hollow body or structure for heated gases subjected to positive pressure, the said hollow body comprising a rotationally symmetrical external wall and a perforated partition wall which extends substantially parallel to the external wall within the hollow body, the intermediate space between the external wall and the partition wall being filled with heat-insulating materials.

Such hollow bodies are used as pressure vessels or more particularly as tubes for example in a circuit of a gas turbine installation with a gas-cooled nuclear power reactor.

In known hollow bodies of this kind as illustrated for example in Swiss Pat. No. 242,910 (U.S. Pat. No. 2,468,902, dated May 3, 1949), the perforation of the partition wall bounding the intermediate space is provided for reasons of pressure compensation between the intermediate space and the remainder of the interior of the hollow body. As a result, the heat-insulating materials in the intermediate space are subjected not only to thermal stresses, which can result in so-called creep in the materials for example, but in cases of pressure variations in the heated gas are also subjected to mechanical stresses. For example, high pressure variations of up to 10 at/sec and above may suddenly happen. In addition to the stresses just mentioned, acoustic and other vibrations may also act on the insulating layer in the conduits.

Owing to thermal and mechanical loads on the layer of insulating material, in hitherto known hollow bodies empty spaces may be produced in the layer of insulating material in the space between the external wall and the partition wall, with the result that the layer of insulation could be gradually destroyed until the hollow body would have to be taken out of operation owing to excessive thermal stress at its external wall.

SUMMARY OF THE INVENTION

The object of the invention is to provide a hollow body for heated gases subjected to positive pressure which has a longer working life and greater operational reliability as compared with hitherto known hollow bodies.

In the case of hollow bodies as initially described, this is achieved in that in the intermediate space between the external wall and perforated partition wall there are provided one or more perforated intermediate walls which are disposed substantially parallel to the external wall and the partition wall, the said intermediate wall or walls subdividing the intermediate space into two or more layer chambers, and that the throttling effect of the perforated partition wall and the perforated intermediate wall or walls increases outwardly from the inside from wall to wall in the hollow body. It is advantageous if the perforated intermediate wall or walls is/are constructed from an alloyed heat-resistant steel plate.

The perforated partition wall and the perforated intermediate wall or walls are provided with annular corrugation profiling extending in the circumferential direction of the wall in order to increase the bending strength of the walls.

For using the hollow body according to the invention for a conduit, it is advantageous if the perforated partition wall is preceded internally relatively to the hollow body in general by a preliminary wall substantially parallel to the partition wall, and between the partition wall and the preliminary wall there is left free a distribution space, and the preliminary wall comprises a ring of apertures only locally in the direction of the gas flow.

A further advantage is achieved by providing, to hold the intermediate wall or walls, the partition wall and the preliminary wall, supporting rings which extend from the external wall to the preliminary wall substantially radially relatively to the hollow body, whereby the layer chambers and the distribution space are subdivided in the direction of the gas flow into axial compartments, and also by arranging the preliminary wall in each case comprising only a single circle of apertures over the length of each axial compartment, the respective plane of the ring of apertures extending at right angles to the longitudinal axis of the hollow body, and situated in the vicinity, but upstream in the direction of the gas flow, of the supporting ring bounding the particular axial compartment of the distribution space.

BRIEF DESCRIPTION OF THE DRAWING

The subject of the invention will be described in detail and explained further with the help of the accompanying diagrammatic drawing showing constructional examples of the invention. In the drawing.

DESCRIPTION OF THE PREFERRED EMBODIMENTS

Figure 1:
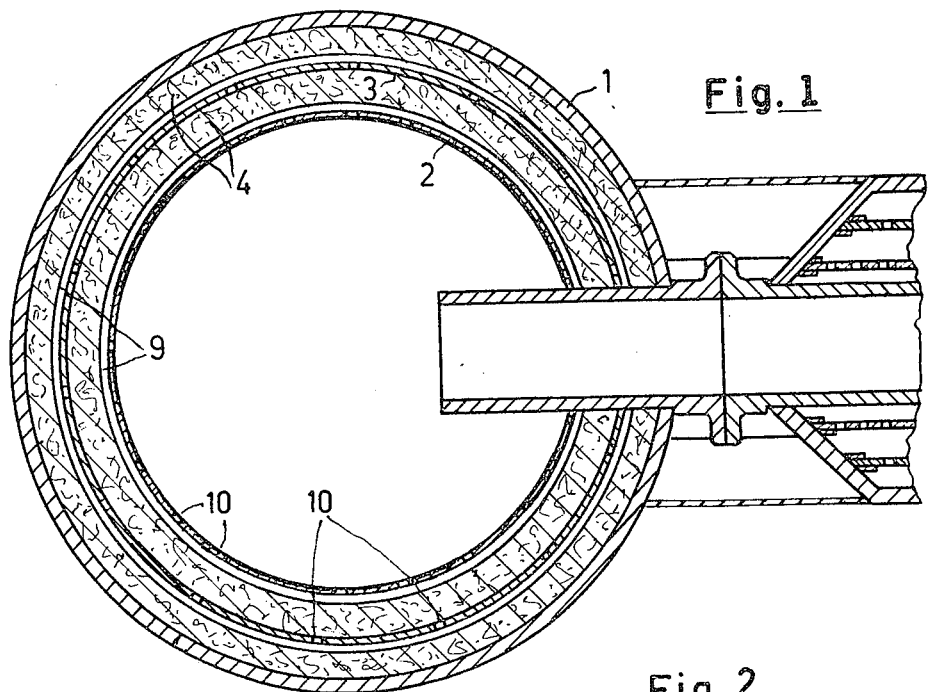
FIG. 1 shows a hollow body according to the invention, namely a pressure vessel with a part of a conduit connected to the pressure vessel.

The hollow body constructed as a pressure vessel comprises a rotationally symmetrical external wall 1. Situated in the hollow body is a perforated partition wall 2 extending parallel to the external wall 1. Between the external wall 1 and the perforated partition wall 2 there is left free an intermediate space 4 which is filled with heat-insulating materials and protects the external wall 1 from the direct action of the heated gas introduced into the hollow body. Arranged in the intermediate space 4 between the external wall 1 and the perforated partition wall 2 is a perforated intermediate wall 3 which is arranged substantially parallel to the external wall 1 and the partition wall 2, thus sub-dividing the intermediate space 4 into two layer chambers filled with insulating materials. The throttling effect of the perforated partition wall 2 and the perforated intermediate wall 3 increases from the partition wall 2 to the intermediate wall 3, that is to say it increases from wall to wall outwardly from the inside relatively to the hollow body. As a result the mechanical stressing of the partition wall 2, which is subjected to relatively high thermal stress, is lower than the mechanical stress on the intermediate wall 3, which is subjected to less thermal stress. But as a result the layer chamber subjected to relatively high thermal stress between the partition wall 2 and the intermediate wall 3 is subjected to less mechanical load than the layer chamber between the external wall 1 and the intermediate wall 3, which is subjected to less thermal stress.

The perforated intermediate wall 3 comprises a smaller number of equal-size perforation holes 10 than the perforated partition wall 2. As a result the throttling effect of the intermediate wall 3 is greater than that of the partition wall 2. But it would also be possible to obtain a greater throttling effect for the intermediate wall 3 in another way, for example by using the same number of perforation holes 10 but smaller holes than in the partition wall 2. Thus the entire cross-section of the perforation holes 10 has to be smaller from the partition wall 2 to the intermediate wall 3.

The partition wall 2 and the intermediate wall 3 are constructed from alloyed heat-resistant steel plates.

To improve the bending strength of the wall, the perforated partition wall 2 and the perforated intermediate wall 3 are each provided with annular corrugation profiling 9 the corrugation being arranged in the circumferential direction of the walls. It would also be possible to provide the walls 2 and 3, for example, with ribs having a square, triangular or semi-circular profile.

A conduit is connected to the pressure vessel from the right-hand side in the illustration. The construction of a conduit according to the invention will be described further.

Figure 2:
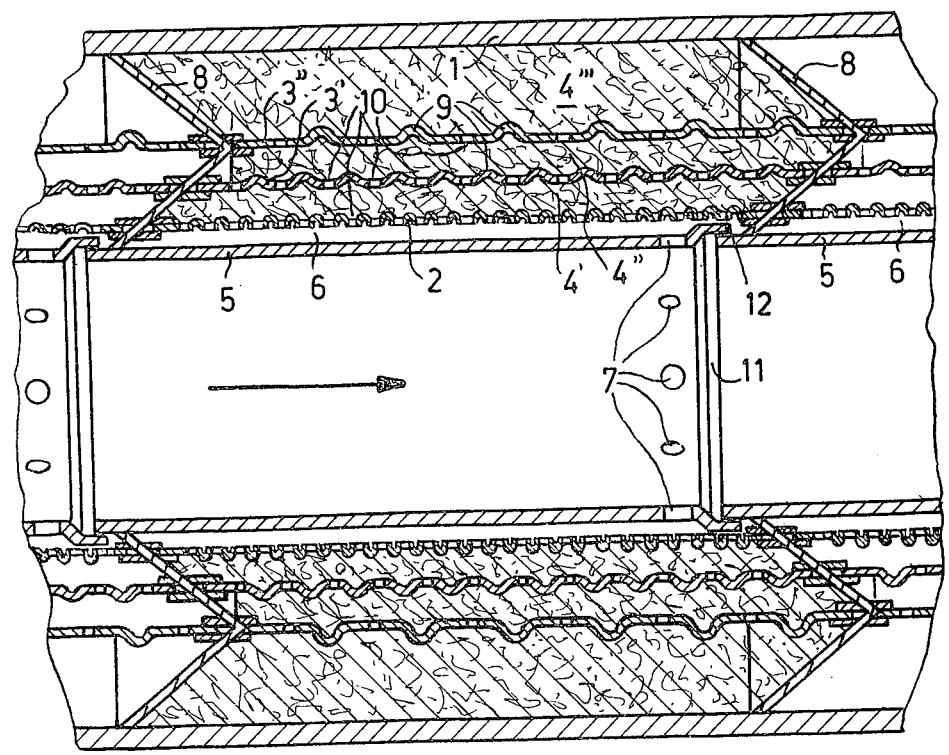
FIG. 2 shows another hollow body, namely a tube.

As FIG. 2 shows more particularly, the hollow body as a tube of a conduit comprises a rotationally symmetrical external wall 1 and in the hollow body a perforated partition wall 2. The intermediate space left free between the walls 1 and 2 is sub-divided into three layer chambers 4', 4'' and 4''' by means of two perforated intermediate walls 3' and 3'' which extend substantially parallel to the external wall 1 and the partition wall 2. The partition wall 2 and also the two intermediate walls 3' and 3'' are provided with annular corrugation profiling 9 extending in the circumferential direction of the walls 2 and 3' and 3'' respectively.

The partition wall 2 is preceded by a preliminary wall 5. This is situated internally of the partition wall 2 relatively to the hollow body in general and extends substantially parallel to the said partition wall. Between the partition wall 2 and the preliminary wall 5 a distribution space 6 is left free. The preliminary wall 5 is provided in the direction of the gas flow, which is shown in the drawing by means of an arrow, only at intervals with a circle of apertures 7 which lead from the distribution space 6 into the internal space of the hollow body. This space is bounded by the preliminary wall 5 and is intended to guide the gas flow.

Supporting rings 8 are provided in the hollow body for holding the intermediate walls 3' and 3'', the partition wall 2 and the preliminary wall 5. They extend from the external wall 1 to the preliminary wall 5 substantially radially relatively to the hollow body and are connected to these walls 1 and 5. As a result the supporting rings 8 sub-divide the layer chambers 4', 4'' and 4''' and also the distribution space 6 in the direction of the gas flow into axial compartments. For holding the partition wall 2 and the intermediate walls 3' and 3'' the supporting rings 8 are provided with holders in which the walls 2, 3' and 3'' are supported with an axial play. The layer chambers 4', 4'' and 4''' are filled with insulating materials.

The preliminary wall 5 comprises only one circle of apertures 7 over the length of each axial compartment of the distribution space 6. The plane of the circle of apertures 7 extends at right angles to the longitudinal axis of the hollow body and is situated in the vicinity, but in the direction of the gas flow upstream, of the supporting ring 8 which defines the particular axial section of the distribution space 6 concerned.

For compensating for longitudinal expansion, the preliminary wall 5 is sub-divided into axial sections at each axial compartment of the distribution space 6 by means of a joint gap 11. The gap 11 is bridged by means of a socket sleeve 12.

It would be possible to provide the intermediate space 4 between the perforated partition wall 2 and the external wall 1 with more intermediate spaces 3 than have been illustrated here, in order thus to subdivide the intermediate space into more layer chambers. The layer chambers could be made much thinner, likewise the plates or sheets used for the intermediate walls 3.

I claim:

1. A hollow body for heated gases which are subjected to positive pressure comprising a rotationally symmetrical external wall and a spaced perforated partition wall which extends substantially parallel to said external wall within said hollow body; heat-insulating material completely filling the intermediate space between said external wall and said partition wall; and at least one perforated intermediate wall in said intermediate space and situated substantially parallel to said external wall and said partition wall, the intermediate wall being embedded in said insulating material and sub-dividing said intermediate space into layer chambers, the throttling effects of said perforated partition and intermediate walls increasing from wall to wall outwardly from the inside of said hollow body.

2. A hollow body according to claim 1 in which said perforated intermediate wall is constructed from an alloyed heat-resistant steel plate.

3. A hollow body according to claim 1 in which said perforated partition and intermediate walls are provided with annular corrugation profiling, extending in the circumferential direction of said walls, to increase the bending strength of the said walls.

4. A hollow body according to claim 1 in which said walls are tubes; said perforated partition wall is preceded internally relatively to said hollow body by a preliminary wall which is substantially parallel to said partition wall, whereby between said partition wall and said preliminary wall a distribution space is left free; and said preliminary wall comprises a circle of apertures only at intervals in the direction of the gas flow.

5. A hollow body according to claim 4 including supporting rings for holding said intermediate, partition and preliminary walls and which extend from said external wall to said preliminary wall substantially radially relatively to the hollow body, whereby said layer chambers and said distribution space are subdivided in the direction of the gas flow into axial compartments.

6. A hollow body according to claim 5 in which said preliminary wall comprises only one said single circle of apertures over the length of each said axial compartment, the particular planes of said circles of apertures extending at right angles to the longitudinal axis of said hollow body and being situated in the vicinity, and in the direction of the gas flow upstream, of said supporting ring defining a particular axial compartment of said distribution space.

7. A hollow body according to claim 1 in which there are at least two of said perforated intermediate walls.

* * * * *